(12) United States Patent
Yiu

(10) Patent No.: US 7,418,275 B2
(45) Date of Patent: Aug. 26, 2008

(54) MOBILE COMMUNICATION APPARATUS WITH ROTATABLE DISPLAY SCREEN

(76) Inventor: Su-Ching Yiu, No.58, Jhong-Jheng S. Rd., Luodong Township, Yilan County, 265 (TW)

( * ) Notice: Subject to any disclaimer, the term of this patent is extended or adjusted under 35 U.S.C. 154(b) by 385 days.

(21) Appl. No.: 11/223,684

(22) Filed: Sep. 9, 2005

(65) Prior Publication Data

US 2006/0240874 A1    Oct. 26, 2006

(30) Foreign Application Priority Data

Apr. 22, 2005    (TW)    .............................. 94112813 A

(51) Int. Cl.
*H04B 1/38*    (2006.01)
*H04M 1/00*    (2006.01)

(52) U.S. Cl. .................. 455/566; 455/550.1; 455/575.1; 455/575.3; 455/90.3

(58) Field of Classification Search ................. 455/566, 455/550.1, 575.1, 90.3, 575.3
See application file for complete search history.

(56) References Cited

U.S. PATENT DOCUMENTS

| 7,079,872 B2 * | 7/2006 | Khalid et al. ................ 455/566 |
| 2004/0058703 A1 * | 3/2004 | Eromaki et al. ........... 455/550.1 |
| 2005/0113135 A1 * | 5/2005 | Goebel et al. ............ 455/556.1 |

\* cited by examiner

*Primary Examiner*—Matthew Anderson
*Assistant Examiner*—April S Guzman
(74) *Attorney, Agent, or Firm*—Muncy, Geissler Olds & Lowe, PLLC

(57) ABSTRACT

The present invention provides a mobile communication apparatus with a rotatable display screen. The mobile communication apparatus, according to the invention, includes a main module, a display module, and an actuating device. The display module includes a frame and a rotatable screen mounted on the frame. The actuating device is operatively connected to the screen and capable of actuating the screen to rotate 180 degrees in response to movement of the display module from a closed position to an open position with respect to the main module.

1 Claim, 8 Drawing Sheets

MOBILE COMMUNICATION APPARATUS WITH ROTATABLE DISPLAY SCREEN

BACKGROUND OF THE INVENTION

1. Field of the Invention

The present invention relates generally to a mobile communication apparatus, and more particularly, to a mobile communication apparatus with a rotatable display screen.

2. Description of the Prior Art

Mobile phones and similar communication devices are rapidly expanding in use and function. Such devices will soon accommodate more diverse services, such as Internet access, personal information management, facsimile, image messaging, and video conferencing, in addition to telephone communication. To accomplish this, there is a need to provide keypads, function buttons, and larger display screens that are compatible with more complex applications to which the mobile device will be adapted. Full function text keyboards, such as the standard QWERTY typing array of keys and buttons, are difficult to provide while maintaining the compact size required in the mobile device. An equally difficult problem is presented by the need for display screens that can display the vast amount of different information that will be accessible by these devices. Such devices on the market today are bulky and often require several accessories to obtain the full array of functions, e.g. a portable keyboard.

There is, therefore, a need to provide a simple and inexpensive full function mobile communications apparatus which can access many services through the use of a single device. It is also a purpose of this invention to provide a configuration of keypad, button deck, and rotatable display which provide a simple and easy-to-use user interface.

SUMMARY OF THE INVENTION

The present invention pertains to a mobile communication apparatus with a rotatable display screen. In one preferred embodiment, the mobile communication apparatus includes a main module, a display module, and an actuating device. The display module includes a frame and a screen. The frame, which has two opposite inner walls, is pivotally connected to the main module. A rotational axis is defined between the two inner walls. The screen is rotatable and mounted between the two inner walls of the frame, and the actuating device is operatively connected to the screen. The actuating device is capable of actuating the screen to rotate 180 degrees around the rotational axis in response to the movement of the display module from a closed position to an open position with respect to the main module.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1A:
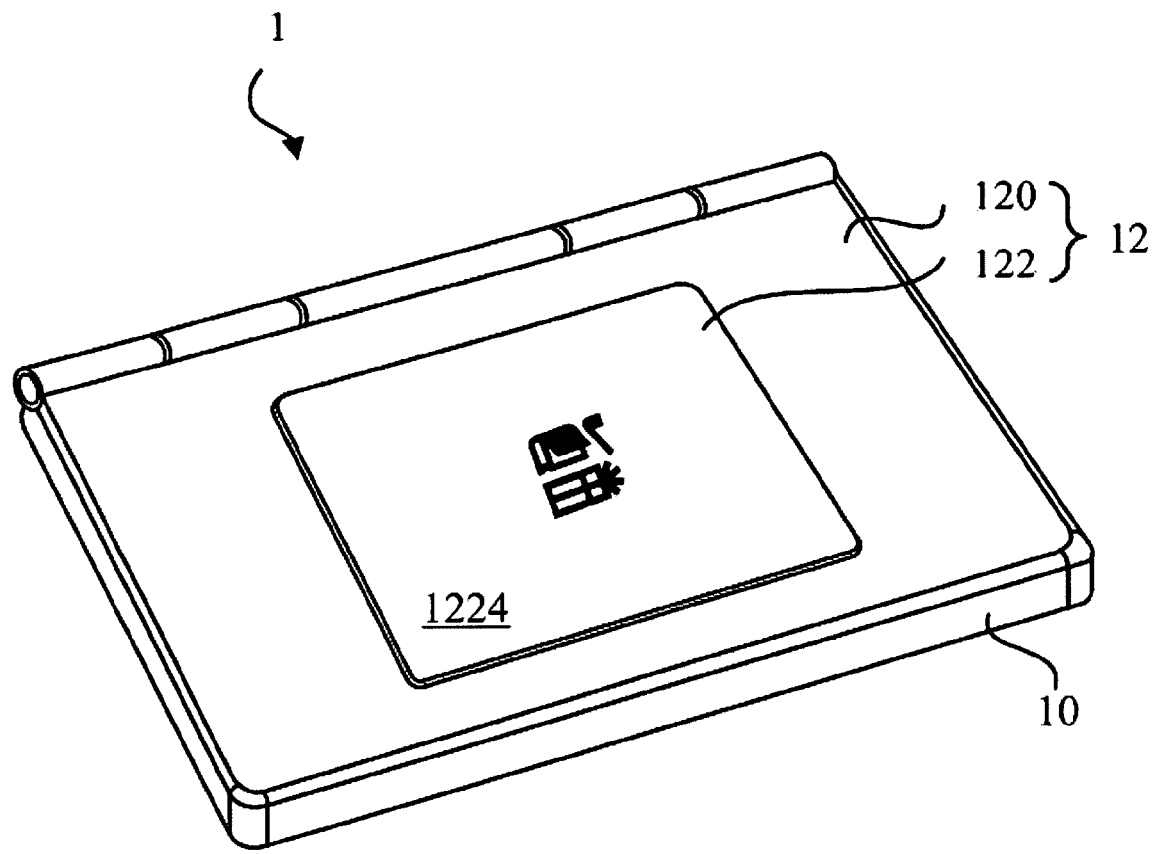
FIG. 1A illustrates one embodiment of a mobile communication apparatus according to the invention in a closed position.
Figure 1B:
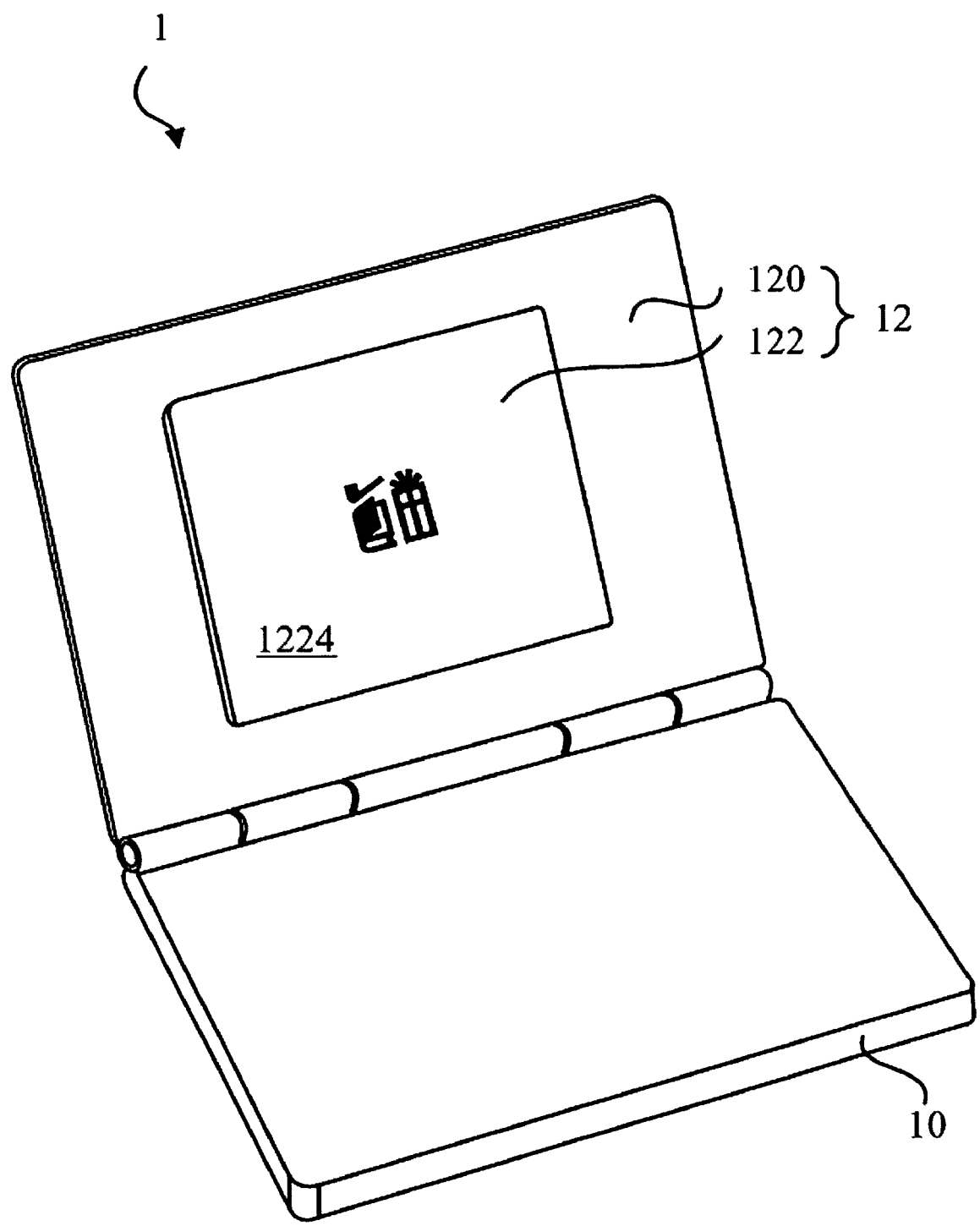
FIG. 1B illustrates one embodiment of a mobile communication apparatus according to the invention in an open position.

Please refer to FIGS. 1A and 1B. FIG. 1A illustrates one embodiment of a mobile communication apparatus 1 according to the invention in a closed position. FIG. 1B illustrates one embodiment of a mobile communication apparatus 1 according to the invention in an open position. The mobile communication apparatus 1, according to a first preferred embodiment of the invention, includes a main module 10, a display module 12, and an actuating device 16 (not shown in FIGS. 1A and 1B). The display module 12 includes a frame 120 and a screen 122. The frame 120, which has two opposite inner walls, is pivotally connected to the main module 10. A rotational axis is defined between the two inner walls. The screen 122 is rotatable and mounted between the two inner walls of the frame 120, and the actuating device 16 is operatively connected to the screen 122. The actuating device 16 is capable of actuating the screen 122 to rotate 180 degrees around the rotational axis in response to the movement of the display module 12 from a closed position to an open position with respect to the main module 10.

As shown in FIG. 1A, the main module 10 includes a housing which contains the internal components of the mobile communication apparatus 1. The screen 122 has a display panel 1224 for displaying a variety of information thereon. In the closed position, the main module 10 is covered beneath the display module 12, and the display panel 1224 is positioned for the viewing of information. On the frame 120, buttons or keypads may be mounted for the basic function of the communication apparatus. In the closed position, the mobile communication apparatus 1 may be used in a similar manner to a portable computing device, such as a mobile phone or PDA (Personal digital assistant). The user may interact with the mobile communication apparatus 1, for example, by pressing buttons on the frame 120 or by touching (e.g. with finger, stylus, etc.) a touch sensitive display panel 1224. A text keyboard may be mounted on top of the main module 10. When the mobile communication apparatus 1 is in the closed position, the text keyboard is concealed under the display module 12. In the open position, the text keyboard, mounted on top of the main module 10, is exposed for use. The image rendered on the display panel 1224 may be respectively rotated from a portrait mode to a landscape mode when the mobile communication apparatus 1 is reconfigured from the closed position (e.g. as illustrated in FIG. 1A) to the open position (e.g. as illustrated in FIG. 1B). In the open position, information is displayed to the user in the landscape mode that is oriented 90 degrees relative to the portrait mode. In other words, the screen 122 is positioned for the viewing of information by rotating 180 degrees, and the text keyboard is accessible to the user to enter information by typing.

Figure 2:
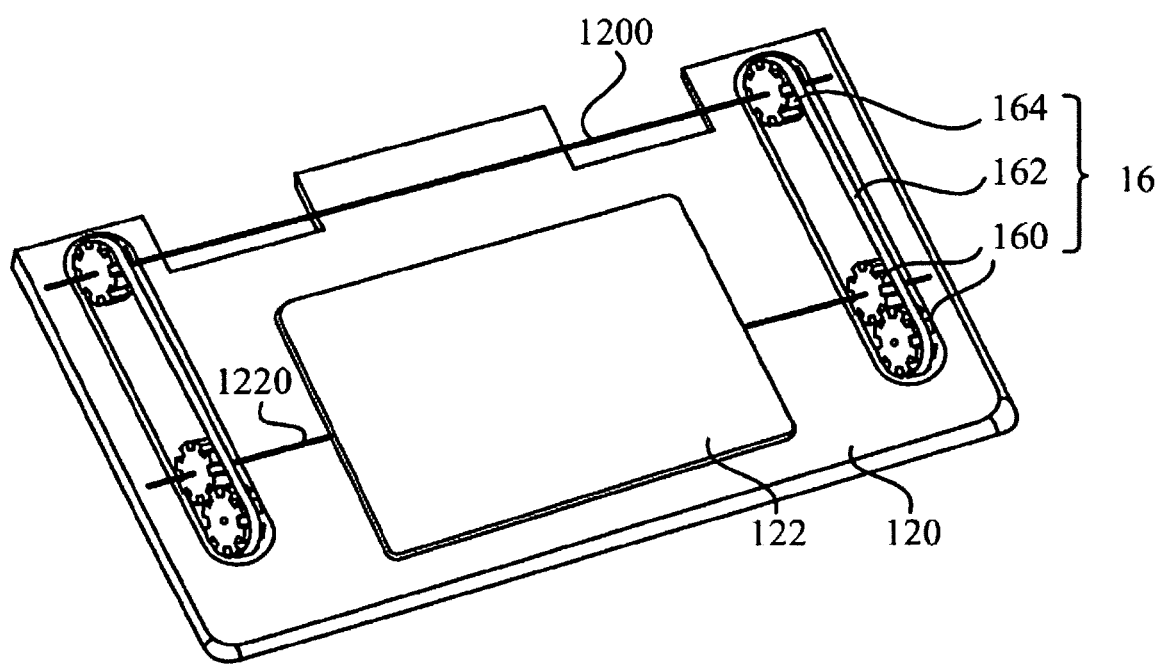
FIG. 2 is an outside perspective view of a display module showing the configuration of an actuating device therein.
Figure 3:
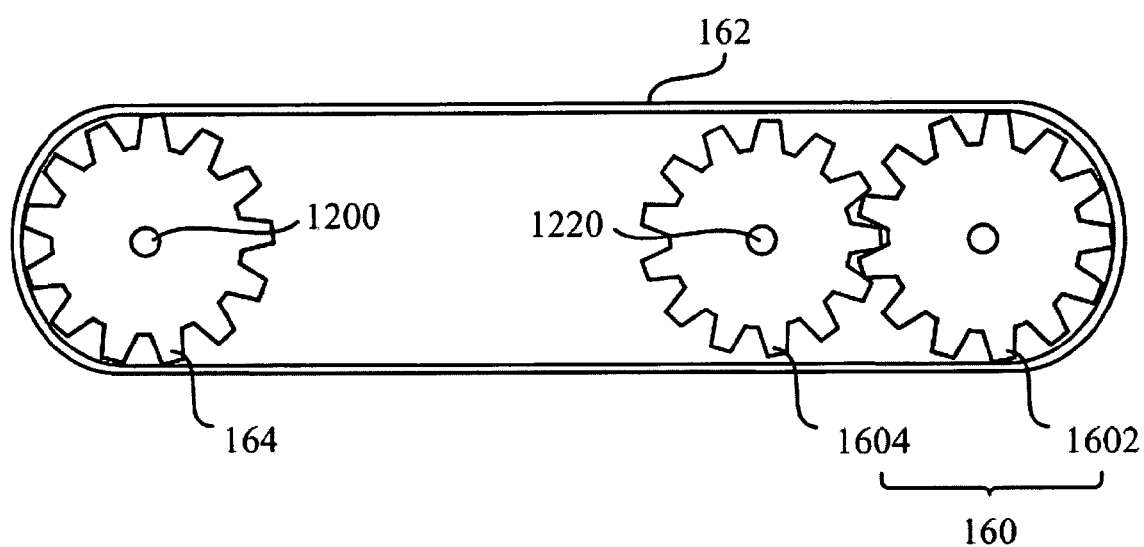
FIG. 3 is a side sectional view of the actuating device shown in FIG. 2.

The screen 122 includes a first shaft 1220 which is disposed along the rotational axis into the frame 120. The first shaft 1220 enables the screen 122 to rotate around the rotational axis in 180 degrees between the closed position and the open position. The frame 120 is pivotally connected to the main module 10 via a second shaft 1200, such that the display module 12 can pivot on the second shaft 1200. Please refer to FIGS. 2 and 3. FIG. 2 is an outside perspective view of the display module 12 showing the configuration of the actuating device 16 therein. FIG. 3 is a side sectional view of the actuating device 16 shown in FIG. 2. As shown in FIG. 2, the actuating device 16 includes a first gear assembly 160, a rack 162, and a second gear assembly 164. The first gear assembly 160 is disposed in the frame 120, so as to actuate the first shaft 1220. The rack 162 is disposed in the frame 120 and meshes with the first gear assembly 160. The second gear assembly 164 is disposed in the frame 120 and meshes with the rack 162. The second gear assembly 164 is also disposed, so as to be actuated by the second shaft 1200. When the display module 12 moves from the closed position to the open position with respect to the main module 10, the screen 122 is actuated to rotate by the second shaft 1200 through the second gear assembly 164, the rack 162, the first gear assembly 160, and the first shaft 1220.

Figure 4:
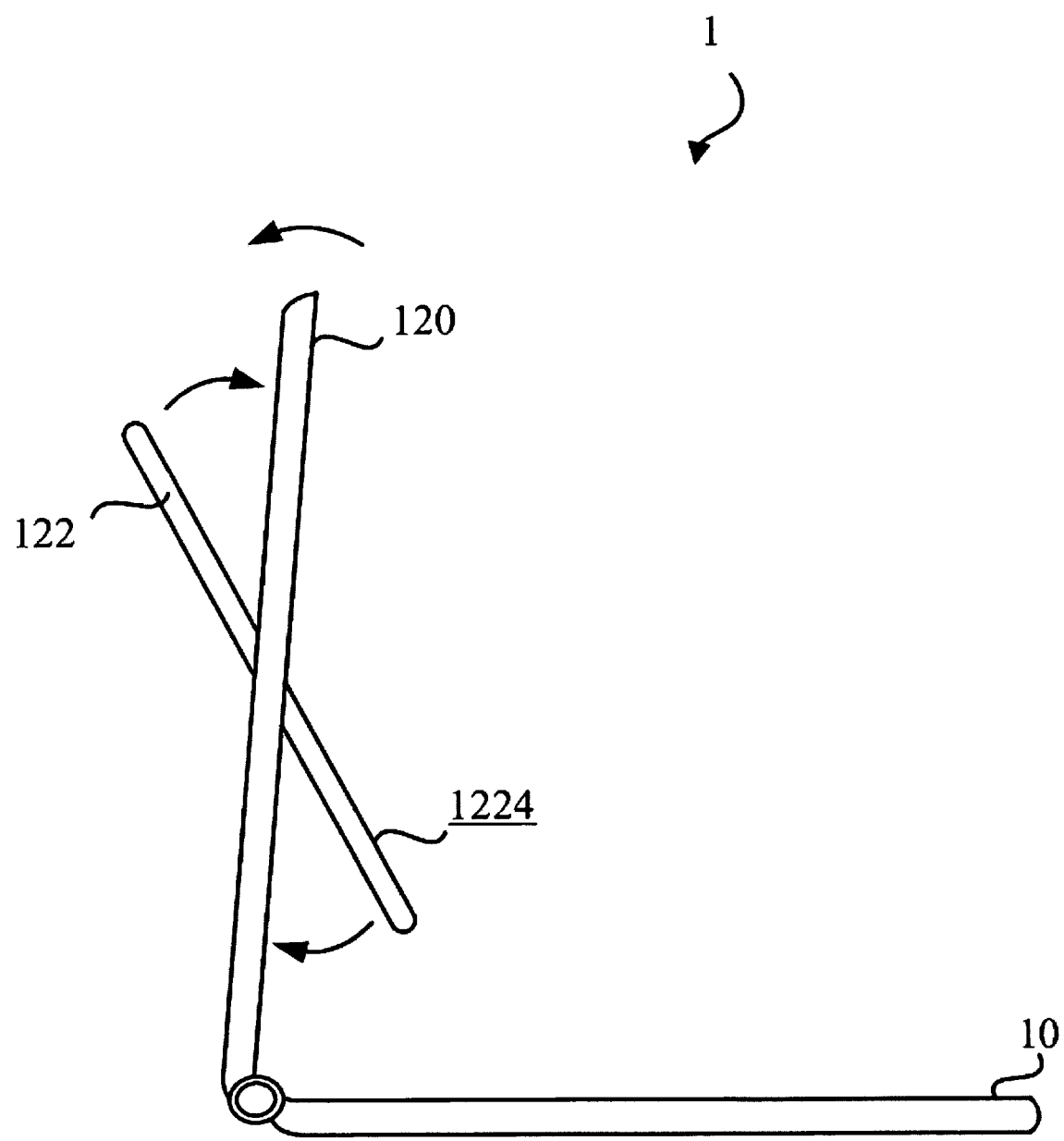
FIG. 4 illustrates an intermediate position during the movement of the display module from a closed position to an open position with respect to the main module.

The mechanics of the actuating device 16 will be further described below in detail. The second shaft 1200 is disposed to pivotally connect the frame 120 to the main module 10, such that the frame 120 can pivot between the closed position and the open position with respect to the main module 10. The second gear assembly 164 is coupled to the second shaft 1200 and is actuated by the second shaft 1200 to rotate in the same direction. As shown in FIG. 3, the first gear assembly 160 further includes a first gear 1602 and a second gear 1604. The rack 162 meshes both the second gear assembly 164 and the first gear 1602 of the first gear assembly 160. The second gear 1604 meshes with the first gear 1602 and is coupled to the first shaft 1220 to actuate the first shaft 1220 to rotate conversely with respect to the second shaft 1200. The first shaft 1220, the second shaft 1200, the first gear assembly 160, the rack 162, and the second gear assembly 164 operate cooperatively to allow the simultaneous rotation of the frame 120 and the screen 122. Referring to FIG. 4, FIG. 4 illustrates an intermediate position during the movement of the display module 12 from the closed position to the open position with respect to the main module 10.

Figure 5:
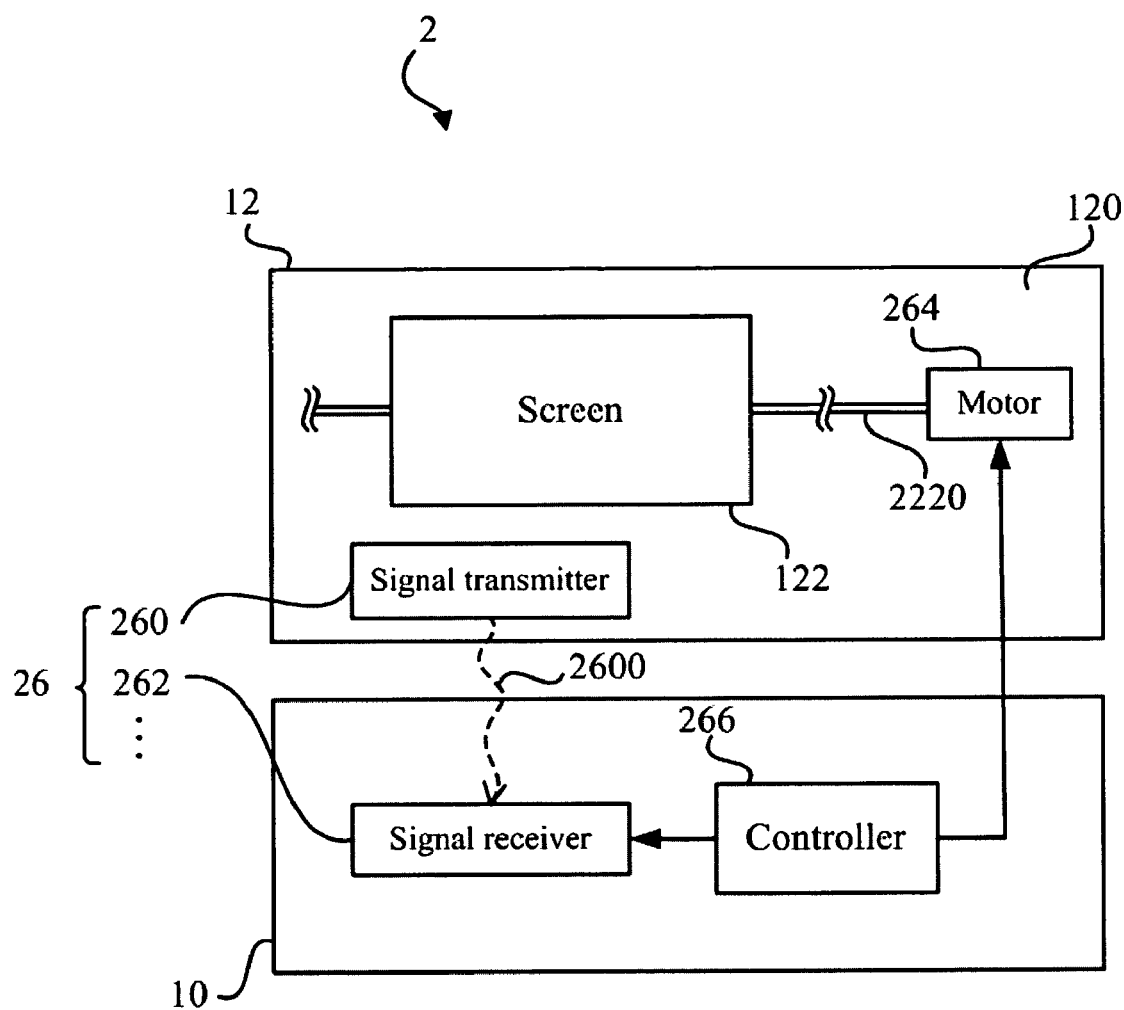
FIG. 5 is a schematic diagram showing the configuration and function blocks of a mobile communication apparatus according to a second preferred embodiment of the invention.

Referring to FIG. 5, FIG. 5 is a schematic diagram showing the configuration and function blocks of a mobile communication apparatus 2 according to a second preferred embodiment of the invention. The mobile communication apparatus 2, according to the second preferred embodiment of the invention, includes a main module 10, a display module 12, and an actuating device 26. The display module 12 includes a frame 120 and a screen 122. All components in common with the first embodiment share the same reference numerals, and the detailed description will be omitted here.

In one embodiment, the screen 122 includes a shaft 2220 which is disposed along the rotational axis into the frame 120. The shaft 2220 enables the screen 122 to rotate around the rotational axis in 180 degrees between the closed position and the open position. The actuating device 26 includes a signal transmitter 260, a signal receiver 262, a motor 264, and a controller 266. The signal transmitter 260 is used for transmitting an active signal 2600, and the signal receiver 262 is used for receiving the active signal 2600. The signal receiver 262 outputs a driving signal when the signal receiver 262 cannot receive the active signal 2600 during the movement of the display module 12 from the closed position to the open position with respect to the main module 10. The motor 264 is disposed in the frame 120 and is operatively connected to the shaft 2220. The controller 266, which is electrically coupled to the signal receiver 262 and the motor 264 respectively, is used for controlling the motor 264 to actuate the screen 122 to rotate around the shaft 2220 in response to the driving signal.

In one embodiment, the signal transmitter 260 is a radiation-based signal transmitter; the active signal 2600 is a radiation beam, and the signal receiver 262 is a radiation-based signal receiver. Particularly, the radiation beam 2600 is an infrared beam, so the radiation-based signal transmitter 260 is an infrared transmitter, and the radiation-based signal receiver 262 is an infrared receiver. In one embodiment, as shown in FIG. 5, the infrared transmitter 260 is disposed in the frame 120, and the infrared receiver 262 is disposed in the main module 10. While the mobile communication apparatus 2 is in operation, the infrared transmitter 260 is used for emitting the infrared beam 2600 constantly in a specific direction. The infrared receiver 262 has a detection area within which the infrared receiver 262 is capable of receiving the infrared beam 2600. The infrared transmitter 260 and the infrared receiver 262 are disposed in a way, such that the infrared beam 2600 irradiated by the infrared transmitter 260 falls within the detection area while the mobile communication apparatus 2 is in the closed position. As a result, the infrared beam 2600 can be detected by the infrared receiver 262. As the display module 12 moves from the closed position to the open position with respect to the main module 10, the irradiation direction of the infrared beam 2600 varies and eventually falls beyond the detection area of the infrared receiver 262. When the infrared receiver 262 cannot receive the infrared beam 2600, the infrared receiver 262 outputs a driving signal to the controller 266. The controller 266 then controls the motor 264 to actuate the screen 122 to rotate around the shaft 2220 in response to the driving signal. As the display module 12 moves from the open position to the closed position with respect to the main module 10, the infrared beam 2600 irradiated by the infrared transmitter 260 falls within the detection area again. The infrared receiver 262 detects the infrared beam 2600 and outputs a driving signal to the controller 266. The controller 266 controls the motor 264 to actuate the screen 122 to rotate conversely around the shaft 2220 in response to the driving signal. In practical application, the infrared transmitter 260 and the infrared receiver 262 can be disposed in the main module 10 and the frame 120 interchangeably.

Figure 6:
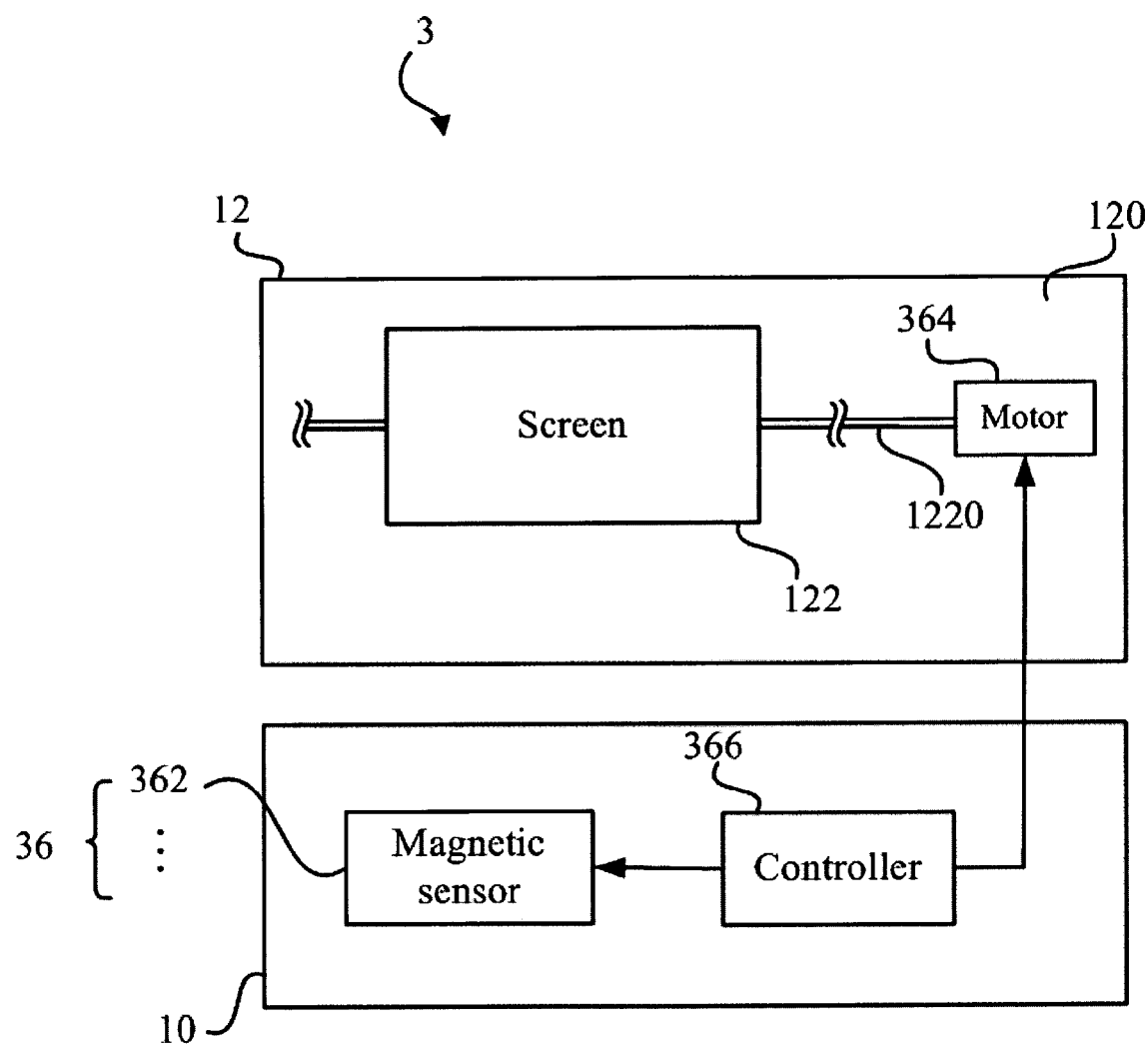
FIG. 6 is a schematic diagram showing the configuration and function blocks of a mobile communication apparatus according to a third preferred embodiment of the invention.

Referring to FIG. 6, FIG. 6 is a schematic diagram showing the configuration and function blocks of a mobile communication apparatus 3 according to a third preferred embodiment of the invention. The mobile communication apparatus 3, according to the third preferred embodiment of the invention, includes a main module 10, a display module 12, and an actuating device 36. The display module 12 includes a frame 120 and a screen 122. In this preferred embodiment, all components in common with the first embodiment share the same reference numerals, and the detailed description will be omitted here.

The screen 122 includes a first shaft 1220, which is disposed along the rotational axis into the frame 120. The first shaft 1220 enables the screen 122 to rotate around the rotational axis in 180 degrees between the closed position and the open position. The frame 120 is pivotally connected to the main module 10 via a second shaft 1200 (not shown in FIG. 6), such that the display module 12 can pivot on the second shaft 1200. The actuating device 36 includes a magnetic member 360 (not shown in FIG. 6), a magnetic sensor 362, a motor 364, and a controller 366. The magnetic member 360 is attached on the second shaft 1200 and produces a magnetic field. The magnetic sensor 362, which is disposed in the main module 10, is used for sensing the strength of the magnetic field produced by the magnetic member 360. The magnetic sensor 362 also outputs a driving signal during the movement of the display module 12 from the closed position to the open position with respect to the main module 10. The motor 364 is disposed in the frame 120 and is operatively connected to the first shaft 1220. The controller 366, which is electrically coupled to the magnetic sensor 362 and the motor 364 respectively, is used for controlling the motor 364 to actuate the screen 122 to rotate around the first shaft 1220 in accordance with the driving signal.

Figure 7A:
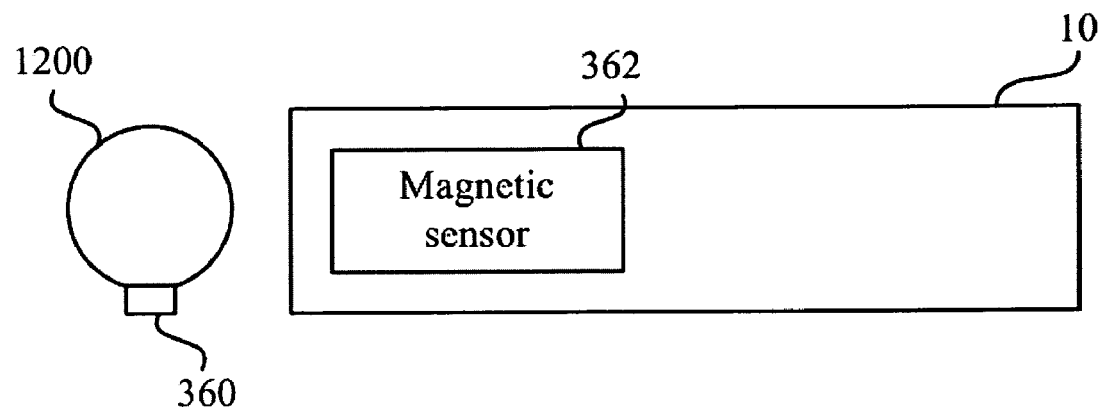
FIG. 7A depicts the configuration of a magnetic member and a magnetic sensor in a closed position according to one embodiment of the invention.
Figure 7B:
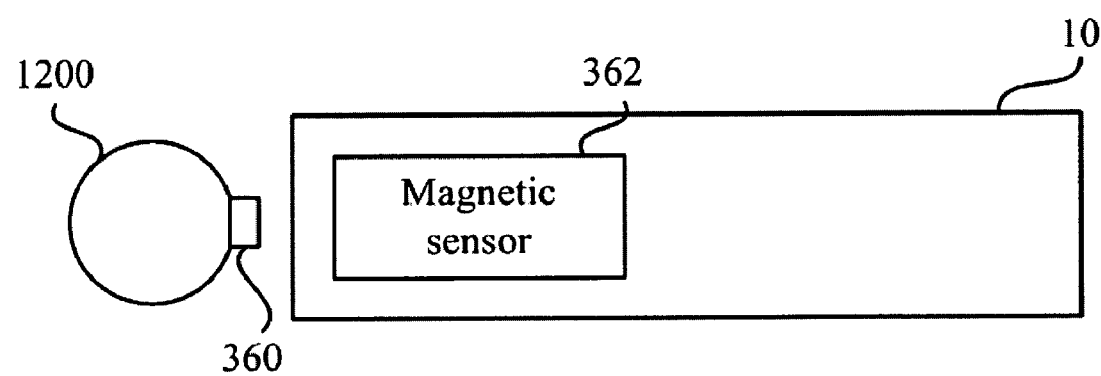
FIG. 7B depicts the configuration of a magnetic member and a magnetic sensor in an open position according to one embodiment of the invention.

In one embodiment, the magnetic member 360 is a magnet attached on the second shaft 1200, and the magnetic sensor 362 is a Hall IC. When passing current through the Hall IC 362, the external magnetic field imposed on the Hall IC 362 forces the electric particles to be off-the-course. The off-the-course electric particles are accumulated on the rim of conductive plate of the Hall IC 362, and that forms a potential difference called Hall voltage. The Hall voltage is proportional to the strength of the magnetic field and is outputted as the driving signal. As shown in FIGS. 7A and 7B, the magnet 360 is attached at a location on the second shaft 1200, such that the magnet 360 is closer to the Hall IC 362 in the open position than in the closed position. Once the mobile communication apparatus 3 moves away from the closed position, the Hall IC 362 is activated by passing current thereon and starts to generate a voltage in response to the magnetic field produced by the magnet 360. As the display module 12 moves from the closed position to the open position with respect to the main module 10, the magnet 360 approaches the Hall IC 362, and the magnetic field strength imposed on the Hall IC 362 gets stronger, resulting in higher Hall voltage. When the controller 366 detects the increasing voltage, the controller 366 controls the motor 364 to actuate the screen 122 to rotate around the first shaft 1220. As the display module 12 moves from the open position to the closed position with respect to the main module 10, the magnet 360 moves away from the Hall IC 362, and the Hall voltage diminishes due to the decayed magnetic field strength. When the controller 366 detects the decreasing voltage, the controller 366 controls the motor 364 to actuate the screen 122 to rotate around the first shaft 1220 conversely.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A mobile communication apparatus, comprising:
   a main module;
   a display module, comprising:
      a frame, pivotally connected to the main module, having two opposite inner walls, a rotational axis being defined between the two inner walls; and
      a screen, rotatably mounted between the two inner walls of the frame, wherein the screen has a first shaft disposed along the rotational axis into the frame, and the frame is pivotally connected to the main module via a second shaft; and
   an actuating device, operatively connected to the screen, comprising:
      a first gear assembly, disposed in the frame so as to actuate the first shaft;
      a rack, disposed in the frame and meshing with the first gear assembly; and
      a second gear assembly, disposed in the frame and meshing with the rack, the second gear assembly being disposed so as to be actuated by the second shaft;
   wherein the actuating device is capable of actuating the screen to rotate 180 degrees around the rotational axis in response to movement of the display module from a closed position to an open position with respect to the main module; and
   wherein when the display module moves from the closed position to the open position with respect to the main module, the screen is actuated to rotate by the second shaft through the second gear assembly, the rack, the first near assembly, and the first shaft.

* * * * *